United States Patent
Tai et al.

(10) Patent No.: US 12,493,012 B2
(45) Date of Patent: Dec. 9, 2025

(54) SENSOR DEVICE AND METHOD FOR MAKING THE SAME

(71) Applicant: National Tsing Hua University, Hsinchu (TW)

(72) Inventors: Nyan-Hwa Tai, Hsinchu (TW); Chi-Young Lee, Hsinchu (TW); Guan-Kai Huang, Hsinchu (TW); Ching Chang, Hsinchu (TW); Shau-San Wu, New Taipei (TW); Jin-Liang Chen, New Taipei (TW); You-Ti Kuo, New Taipei (TW)

(73) Assignee: National Tsing Hua University, Hsinchu (TW)

( * ) Notice: Subject to any disclaimer, the term of this patent is extended or adjusted under 35 U.S.C. 154(b) by 433 days.

(21) Appl. No.: 17/940,399

(22) Filed: Sep. 8, 2022

(65) Prior Publication Data
US 2023/0288363 A1    Sep. 14, 2023

(30) Foreign Application Priority Data
Mar. 11, 2022   (TW) .................................. 111109060

(51) Int. Cl.
G01N 27/327       (2006.01)
G01N 27/414       (2006.01)

(52) U.S. Cl.
CPC ....... *G01N 27/327* (2013.01); *G01N 27/4145* (2013.01)

(58) Field of Classification Search
CPC ............. G01N 27/327; G01N 27/4145; G01N 27/3278
See application file for complete search history.

(56) References Cited

U.S. PATENT DOCUMENTS

2009/0101498 A1 * 4/2009 Papadimitrakopoulos ................. C01B 13/0285
423/579

FOREIGN PATENT DOCUMENTS

| JP | 2015-147373 A | 8/2015 |
| JP | 2021-89152 A | 6/2021 |

OTHER PUBLICATIONS

Zhao et al., Multilayer membranes for glucose biosensing via layer-by-layer assembly of multiwall carbon nanotubes and glucose oxidase, Analytical Biochemistry, 2006, 350, 138-144 (Year: 2006).*

(Continued)

*Primary Examiner* — Luan V Van
*Assistant Examiner* — Shizhi Qian
(74) *Attorney, Agent, or Firm* — Birch, Stewart, Kolasch & Birch, LLP

(57) ABSTRACT

A sensor device is adapted to detect glucose concentration in saliva of an object, and includes a conductive substrate, a polymer layer, and a carbon nanomaterial unit. The polymer layer is disposed on the conductive substrate and is made from conducting polymer. The carbon nanomaterial unit is disposed on the polymer layer and includes at least one carbon-nanotube layer. The saliva of the object is applied on the carbon nanomaterial unit and an enzyme is added to be mixed with the saliva to detect the glucose concentration in the saliva. A method for making the sensor device is also provided.

11 Claims, 10 Drawing Sheets

(56) References Cited

OTHER PUBLICATIONS

Lee et al., Conducting polymer coated graphene oxide electrode for rechargeable lithium-sulfur batteries, Journal of Nanoscience and Nanotechnology, 2016, 16, 2692-2695 (Year: 2016).*

Komathi et al., Fabrication of a novel layer-by-layer film based glucose biosensor with compact arrangement of multi-components and glucose oxidation, Biosensors and Bioelectronics, 2009, 24, 3131-3134 (Year: 2009).*

Zhong et al., In situ chemo-synthesized multi-wall carbon nanotube-conductive polyaniline nanocomposites: characterization and application for a glucose amperometric biosensor, Talanta, 2011, 85, 104-111 (Year: 2011).*

Wang et al., Sensitivity enhancement of cloth-based closed bipolar electrochemiluminescence glucose sensor via electrode decoration with chitosan/multi-walled carbon nanotubes/graphene quantum dots-gold nanoparticles, Biosensors and Bioelectronics, 2019, 130, 55-64 (Year: 2019).*

Wang et al., Carbon-nanotube doped polypyrrole glucose biosensor, Analytica Chimica Acta, 2005, 539, 209-213 (Year: 2005).*

Qu et al., Amperometric biosensor for choline based on layer-by-layer assembled functionalized carbon nanotube and polyaniline multilayer film, Analytical Biochemistry, 2005, 344, 108-114 (Year: 2005).*

Davis et al., "Glucose Biosensors-Recent Advances in the Field of Diabetes Management", Micro Fuel Cells, Dec. 2009, p. 243-292.

* cited by examiner (a) (b)

(c) (d)

(e) (f)

SENSOR DEVICE AND METHOD FOR MAKING THE SAME

CROSS-REFERENCE TO RELATED APPLICATION

This application claims priority of Taiwanese Invention Patent Application No. 111109060, filed on Mar. 11, 2022.

FIELD

The disclosure relates to a sensor device and a method for making the same, and more particularly to a sensor device for detecting glucose concentration in saliva of an object.

BACKGROUND

Diabetes is a major worldwide chronic disease and one of the primary causes of death. For a diabetic patient, detection of his/her blood glucose level by virtue of an everyday routine blood test using a lancet is a main basis for diabetes treatment. On the other hand, for a potential diabetic patient, periodic blood glucose test may serve as an alert of possible illness.

However, at present, a blood glucose test is carried out by an invasive process that uses a lancet for obtaining a blood sample. The wounds caused by the lancet may bring pain to the patient and put the patient at risk of a wound infection, thereby lowering the patient's willingness to undergo the test.

Therefore, there is a need for developing a non-invasive saliva glucose sensor device for home detection and monitoring purposes so as to benefit diabetic patients.

SUMMARY

Therefore, an object of the disclosure is to provide a sensor device that can alleviate or eliminate at least one of the drawbacks of the prior art. A second object of the disclosure is to provide a method for making the sensor device.

According to a first aspect of the disclosure, a sensor device adapted to detect glucose concentration in saliva of an object includes a conductive substrate, a polymer layer disposed on the conductive substrate and made from conducting polymer, and a carbon nanomaterial unit disposed on the polymer layer and including at least one carbon-nanotube layer. The saliva of the object is applied on the carbon nanomaterial unit and an enzyme is added to be mixed with the saliva to detect the glucose concentration in the saliva.

According to a second aspect of the disclosure, a method for making a sensor device includes the following steps: providing a conductive substrate; immersing the conductive substrate in a first solution containing monomers of conducting polymer to form a polymer layer on the conductive substrate; and preparing a second solution containing a plurality of carbon nanotubes and applying the second solution on the polymer layer so as to form at least one carbon-nanotube layer on the polymer layer.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
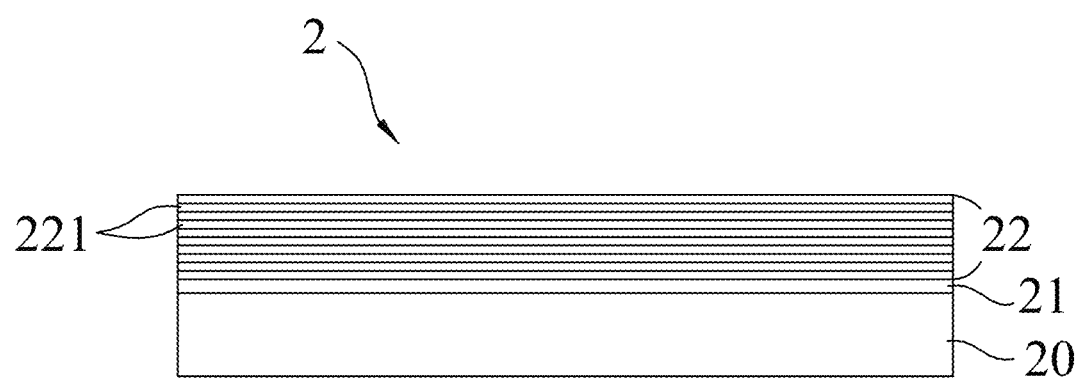
FIG. 1 is a schematic view of an embodiment of a sensor device in accordance with the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
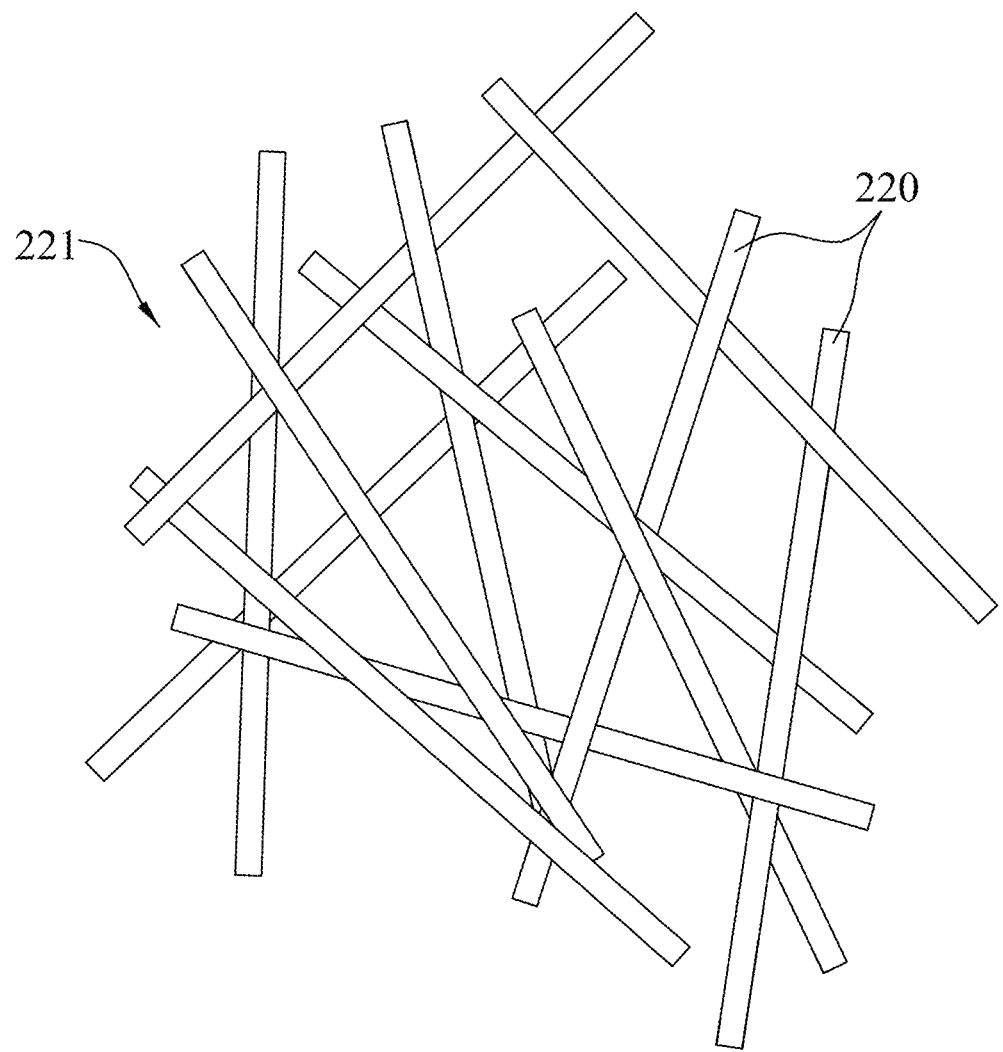
FIG. 2 is a schematic view showing a plurality of carbon-nanotubes in a carbon-nanotube layer of the embodiment of the sensor device shown in FIG. 1.

Referring to FIGS. 1 and 2, an embodiment of a sensor device 2 according to the present disclosure is adapted to detect glucose concentration in saliva of an object, and includes a conductive substrate 20, a polymer layer 21 disposed on the conductive substrate 20, and a carbon nanomaterial unit 22 disposed on the polymer layer 21.

Specifically, the conductive substrate 20 may be one of a fluorine-doped tin oxide (FTO) substrate, an indium tin oxide (ITO) substrate, and a glass substrate (e.g., carbon glass substrate). In this embodiment, the conductive substrate 20 is the fluorine-doped tin oxide (FTO) substrate.

The polymer layer 21 is made from conducting polymer. A material for the polymer layer 21 may be conductive and biocompatible, and has an attachment characteristic so as to connect the conductive substrate 20 and the carbon nanomaterial unit 22. The polymer layer is made from one of polypyrrole (PPy), polyaniline (PANI), polythiophene (PT), poly(p-phenylene sulfide) (PPS), and combinations thereof. In this embodiment, polypyrrole is used for the polymer layer 21.

The carbon nanomaterial unit 22 is disposed on the conductive substrate 21 and includes a plurality of carbon-nanotube layers 221. Each of the carbon-nanotube layers 221 includes a plurality of carbon-nanotubes (CNTs) 220 that extend randomly and intersectionally. By means of using the carbon-nanotubes 220 having high specific surface area in cooperation with high conductive polypyrrole, the electron transmission efficiency could be increased and the sensor device 2 may have an excellent conductive property and sensing response. In certain embodiments, the carbon nanomaterial unit 22 may include 5 to 15 layers of the carbon-nanotube layers 221. In this embodiment, the carbon nanomaterial unit 22 includes 10 layers of the carbon-nanotube layers 221. The carbon-nanotubes 220 may be subjected to an acid treatment in order to increase the hydrophilicity thereof. In this embodiment, the carbon-nanotubes 220 are subjected to an acid treatment for 2.5 hours.

When the sensor device 2 is employed for detection, the saliva of the object is applied on the carbon nanomaterial unit 22, and an enzyme is then added to be mixed with the saliva to detect the glucose concentration in the saliva. In other words, in this disclosure, the detection of the glucose concentration in the saliva is carried out by means of adding an enzyme as an external element. This method can eliminate the costs for coating an enzyme layer, and enable a contact surface area between the enzyme and the saliva to be effectively increased, which in turn can enhance a reaction between the glucose and the enzyme and further improve the sensing performance.

An embodiment of a method for making the sensor device 2 according to the present disclosure includes the following steps.

First, the conductive substrate 20, such as the aforementioned fluorine-doped tin oxide (FTO) substrate is provided.

Next, the conductive substrate 20 is immersed in a first solution containing monomers of the conducting polymer to form the polymer layer 21 on the conductive substrate 20. Specifically, the first solution is obtained by mixing uniformly an aqueous ammonium persulfate solution, which is prepared by dissolving ammonium persulfate (APS) powder in deionized water, with an aqueous sulfuric acid solution and pyrrole monomers. The conductive substrate 20 is then immersed directly in the first solution to self-form a polypyrrole conductive polymer on the conductive substrate 20. Finally, the polypyrrole conductive polymer with the conductive substrate 20 is washed by deionized water and is then dried to obtain the polymer layer 21 on the conductive substrate 20. By virtue of forming the polymer layer 21 on the conductive substrate 20, connection between the conductive substrate 20 and a substance (e.g., the carbon nanomaterial unit 22) disposed subsequently on the conductive substrate 20 is enhanced.

Next, a second solution containing a plurality of carbon nanotubes 220 is prepared, and the second solution is applied on the polymer layer 21 drop by drop so as to form the carbon nanomaterial unit 22 having the carbon-nanotube layers 221 on the polymer layer 21.

More specifically, before the second solution is prepared, the carbon nanotubes 220 are subjected to an acid treatment in order to increase the hydrophilicity thereof. The acid treatment includes adding the carbon nanotubes 220 into a third solution containing sulfuric acid and nitric acid at a volume ratio of 3:1 to form a mixture, heating the mixture at a temperature ranging from 70° C. to 100° C. for different treatment time (e.g., for 1 hour, 2.5 hours and 4 hours), cooling the mixture to obtain the acid-treated carbon nanotubes 220, rinsing the acid-treated carbon nanotubes with deionized water, and drying the acid-treated carbon nanotubes 220. Finally, the acid-treated carbon nanotubes 220 is mixed with deionized water to form an aqueous acid-treated carbon nanotube solution. The aqueous acid-treated carbon nanotube solution is then mixed with 99% ethanol at a volume ratio of 1:3 to form the second solution.

After the second solution is prepared, the second solution is applied on the polymer layer 21 drop by drop, and then the second solution on the polymer layer 21 is dried to form a first one of the carbon-nanotube layers. The second solution is applied on the first one of the carbon-nanotube layers 221 drop by drop, followed by drying the second solution to form a second one of the carbon-nanotube layers 221. The processes of applying the second solution drop by drop and drying the second solution are repeated to form remaining ones of the carbon-nanotube layers 221. In certain embodiments, the conductive substrate 20 with the polymer layer 21 is first disposed on a heating platform at a temperature of 50° C. When the second solution is applied on the carbon-nanotube layer 221 drop by drop, one layer of the carbon-nanotube layers 221 will be formed as the second solution on the carbon-nanotube layer 221 is dried by the heated platform. The processes of applying and drying are conducted 10 times to form the carbon nanomaterial unit 22 that includes 10 layers of the carbon-nanotube layers 221. This is how the sensor device 2 having the carbon nanomaterial unit 22 and the polymer layer 21 is obtained. It should be noted that the carbon nanomaterial unit 22 may have 5 to layers of carbon-nanotube layers 221.

Figure 3:
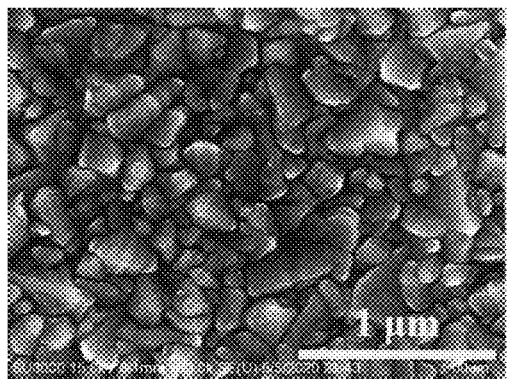
FIG. 3 are scanning electron microscope (SEM) images illustrating surface patterns of polymer layers of the embodiment that are formed under different immersing time.
Figure 3:
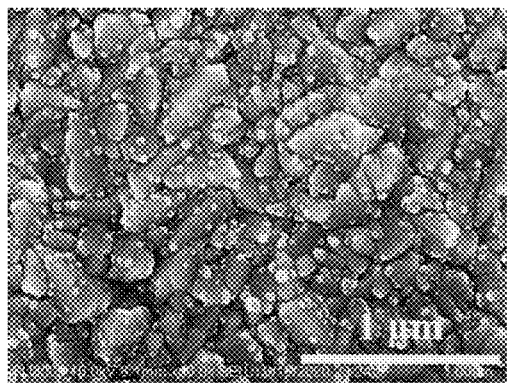
Figure 3:
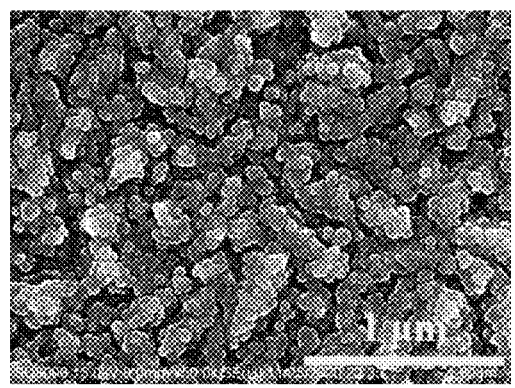
Figure 3:
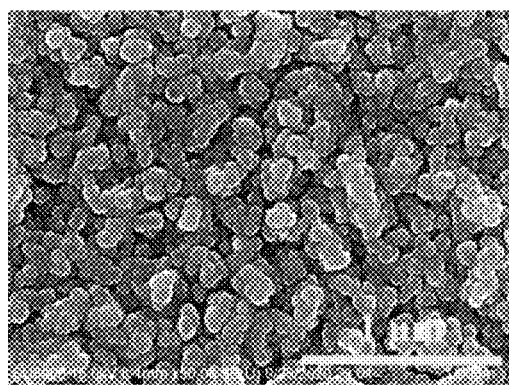
Figure 3:
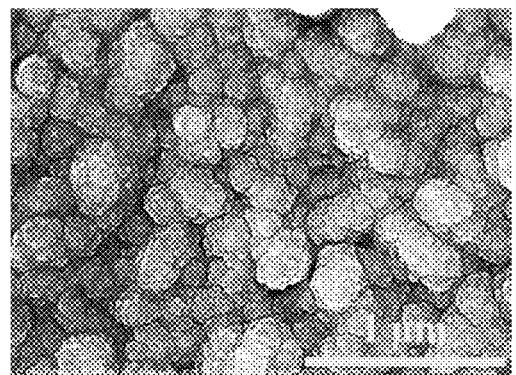
Figure 3:
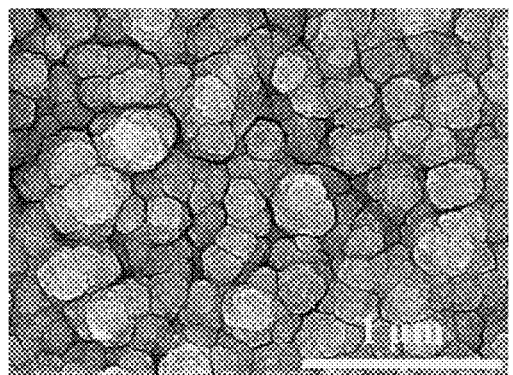

Referring to FIG. 3, FIG. 3(a) is a SEM image illustrating the surface morphology of the conductive substrate 20 (FTO), while FIG. 3(b) to FIG. 3(f) are SEM images illustrating the surface morphologies of the polymer layers 21 formed respectively under a 15-minute immersion period, a 20-minute immersion period, a 30-minute immersion period, a 1-hour immersion period, and a 1.5-hour immersion period. From each of the images of FIG. 3, it is understood that the surface of the polymer layer 21 that is formed under a 20-minute immersion period (FIG. 3(c)) is relatively rougher, and therefore has a greater surface area, which can enable a better electrochemical reaction in the subsequent application thereof.

Figure 4:
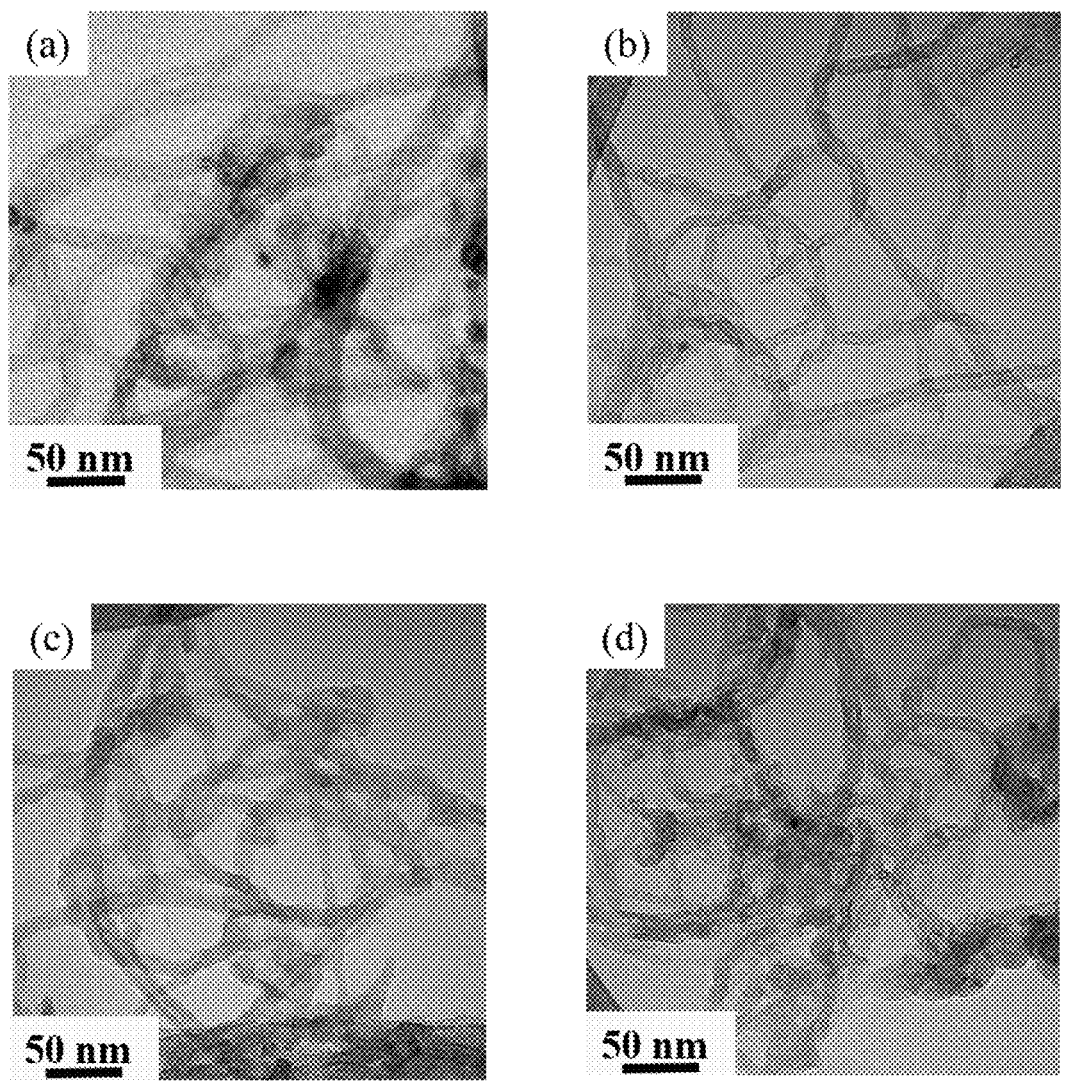
FIG. 4 are transmission electron microscope (TEM) images illustrating surface patterns of the carbon-nanotubes after an acid treatment under different treatment time.
Figure 5:
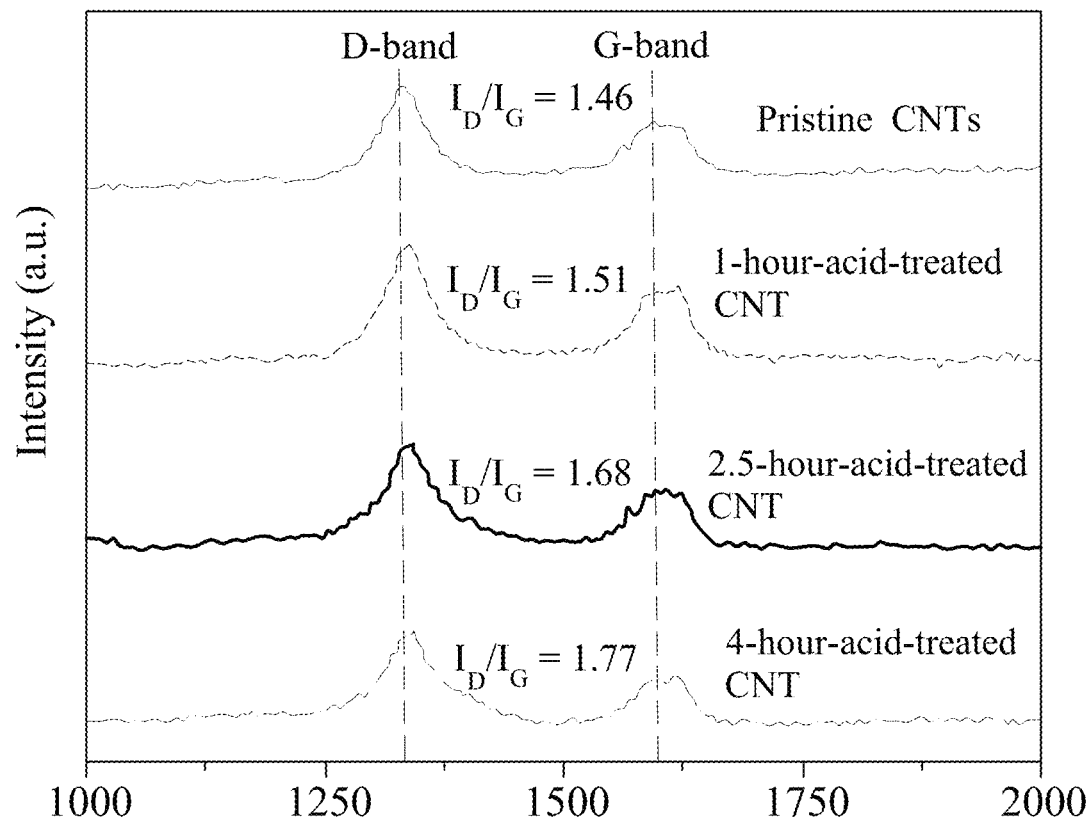
FIG. 5 is a Raman spectrogram of the carbon-nanotubes of FIG. 4.

FIG. 4(a) is a TEM image illustrating the surface morphologies of the carbon-nanotubes 220 that are not subjected to the acid treatment, while FIG. 4(b) to FIG. 4(d) are TEM images illustrating the surface morphologies of the carbon-nanotubes 220 that are subjected to the acid treatment for 1 hour, 2.5 hours, and 4 hours, respectively. It is understood from FIG. 4 that, after being subjected to the acid treatment for 2.5 hours (FIG. 4(c)) and 4 hours (FIG. 4(d)), the carbon-nanotubes 220 have superior surface roughness. Furthermore, FIG. 5 is a Raman spectrogram of the carbon-nanotubes 220 shown in FIG. 4. From FIG. 5 and Table 1, it is understood that after being subjected to the acid treatment for 2.5 hours (FIG. 4(c)) and 4 hours (FIG. 4(d)), the carbon-nanotubes 220 have higher $I_D/I_G$ (1.68 and 1.77 respectively) and better $R_q$ values, which indicates that the carbon-nanotubes 220 shown in FIG. 4(c) and FIG. 4(d) have relatively more surface defects and superior surface roughness. Thus, the carbon-nanotubes 220 have a larger surface area to be in contact with the saliva sample, and hence have enhanced sensing and detecting performance.

TABLE 1

| Working electrodes | $R_q$ (nm) | Surface area ($\mu m^2$) |
|---|---|---|
| FTO | 29.9 | 5.14 |
| PPy/FTO | 26.0 | 4.91 |
| 1 hour-acid-treated CNTs/PPy/FTO | 56.3 | 6.33 |

TABLE 1-continued

| Working electrodes | $R_q$ (nm) | Surface area (μm²) |
| --- | --- | --- |
| 2.5 hour-acid-treated CNTs/PPy/FTO | 65.6 | 6.56 |
| 4 hour-acid-treated CNTs/PPy/FTO | 63.4 | 6.49 |

Figure 6:
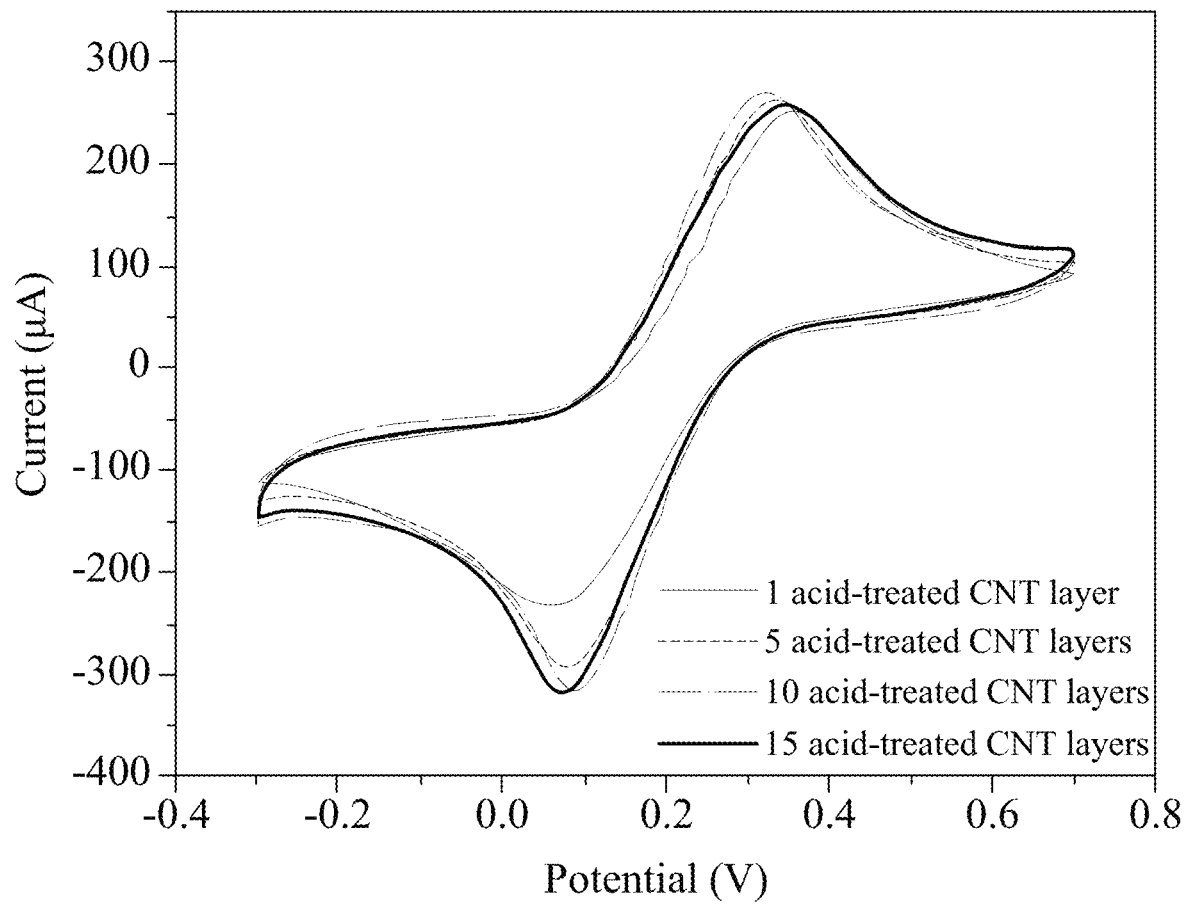
FIG. 6 is a cyclic voltammogram illustrating the oxidation-reduction currents of the sensor devices having different numbers of the carbon-nanotube layers in an electrolyte solution (5 mM $K_3[Fe(CN)_6]$ in 0.1 M KCl)

FIG. 6 illustrates cyclic voltammograms of sensor devices having different number of the carbon-nanotube layers 221 in an electrolyte solution (5 mM $K_3[Fe(CN)_6]$ in 0.1 M KCl). It is understood from FIG. 6 that, when the carbon nanomaterial unit 22 includes 5 to 15 layers of the carbon-nanotube layers 221 (especially 10 layers of the carbon-nanotube layers 221), the sensor device of this disclosure produces superior oxidation-reduction signal. This result is also proven by the relatively low charge transfer resistance ($R_{ct}$) and solution resistance ($R_s$) shown in Table 2.

TABLE 2

| Number of carbon-nanotube layer | Charge transfer resistance ($R_{ct}$) (Ω) | Solution resistance ($R_s$) (Ω) |
| --- | --- | --- |
| 1 layer | 118.8 | 90.7 |
| 5 layers | 92.1 | 87.3 |
| 10 layers | 56.6 | 86.5 |
| 15 layers | 82.6 | 94.2 |

When the glucose concentration in the saliva of the object is to be detected by the sensor device 2 of the present disclosure, the saliva of the object is applied on the carbon nanomaterial unit 22, and then an enzyme is added to be mixed with the saliva to detect the glucose concentration in the saliva. That is, the saliva of the object is mixed with an enzyme (e.g., glucose oxidase (GOx) having high specificity) in the sensor device 2 of the present disclosure. In this manner, the need for coating an enzyme first on the sensor device 2 can be eliminated, and the enzyme can be sufficiently mixed with the glucose in the saliva, thereby enhancing the subsequent sensing response.

Specifically, as compared to the prior art in which the enzyme is coated on a sensor device, in the present disclosure, the enzyme, as an external element, is added to and mixed with a glucose-containing solution (e.g., a saliva sample), and the reduction of the oxygen in the solution is detected so as to indirectly detect glucose concentration. In view of the above, it is understood that an additional step of coating an enzyme on a conventional sensor device is required in the prior art, which increases cost of manufacturing and prevents an effective mixing of the enzyme and the saliva of the object.

Figure 7:
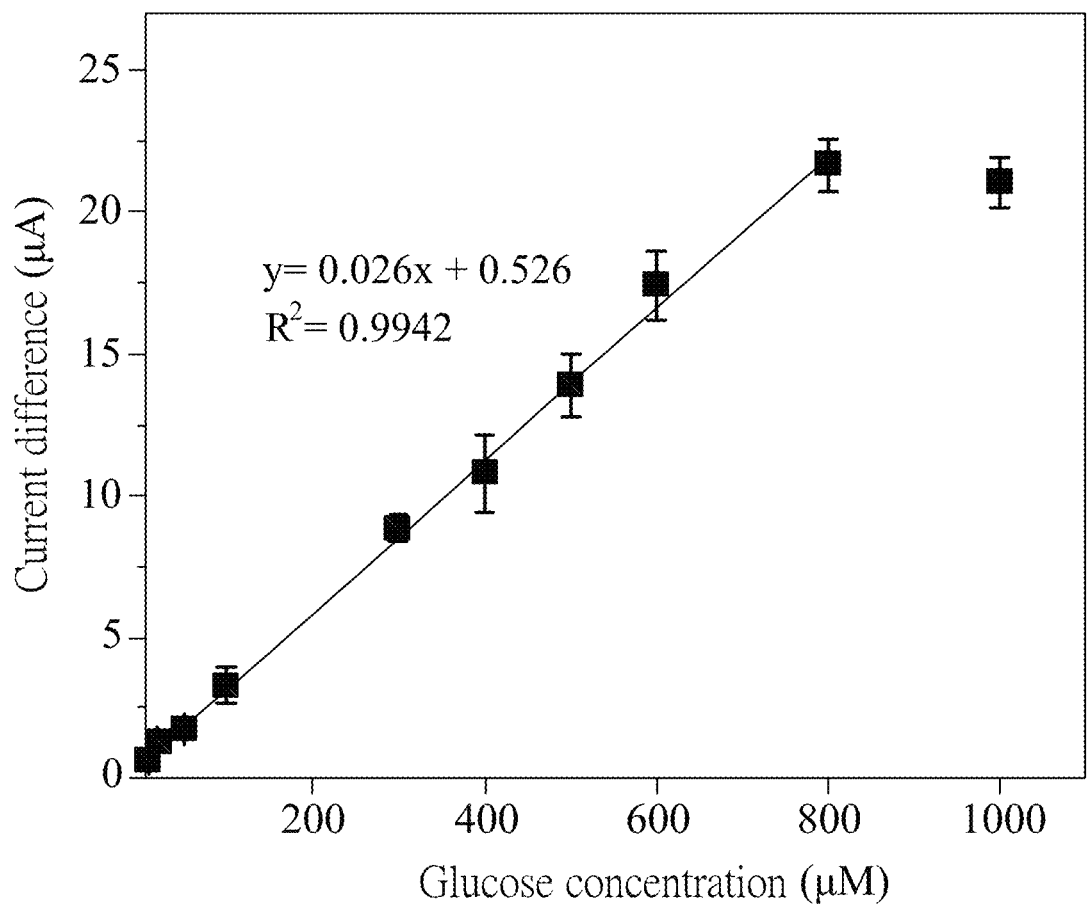
FIG. 7 is a graph illustrating the relationship between the current difference and the glucose concentration, in which glucose solutions are measured by the embodiment of the sensor device in accordance with the present disclosure.

Glucose solutions with different levels of glucose concentration are measured by the sensor device 2 of the present disclosure. It is indicated that the reduction peak current decreases gradually as the glucose concentration increases, so that a significant current difference can be obtained. It can be seen from FIG. 7 that the sensor device 2 is capable of detecting the glucose concentration ranging from 10 μM to 800 μM, which sufficiently covers the range of the glucose concentration in the saliva, and exhibits an excellent sensitivity.

Figure 8:
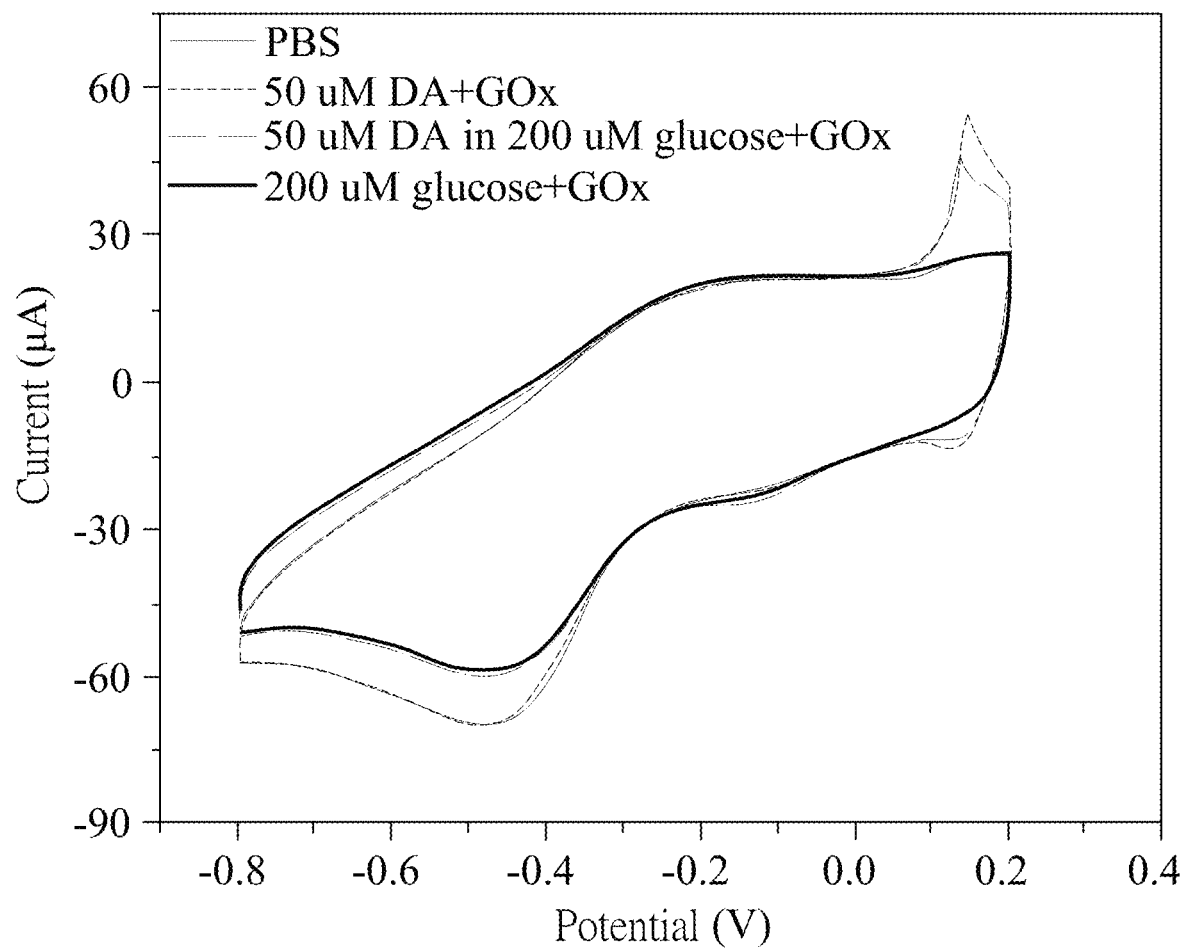
FIG. 8 is a cyclic voltammogram of the oxidation-reduction currents of different interfering samples that are measured by the embodiment of the sensor device in accordance with the present disclosure.
Figure 9:
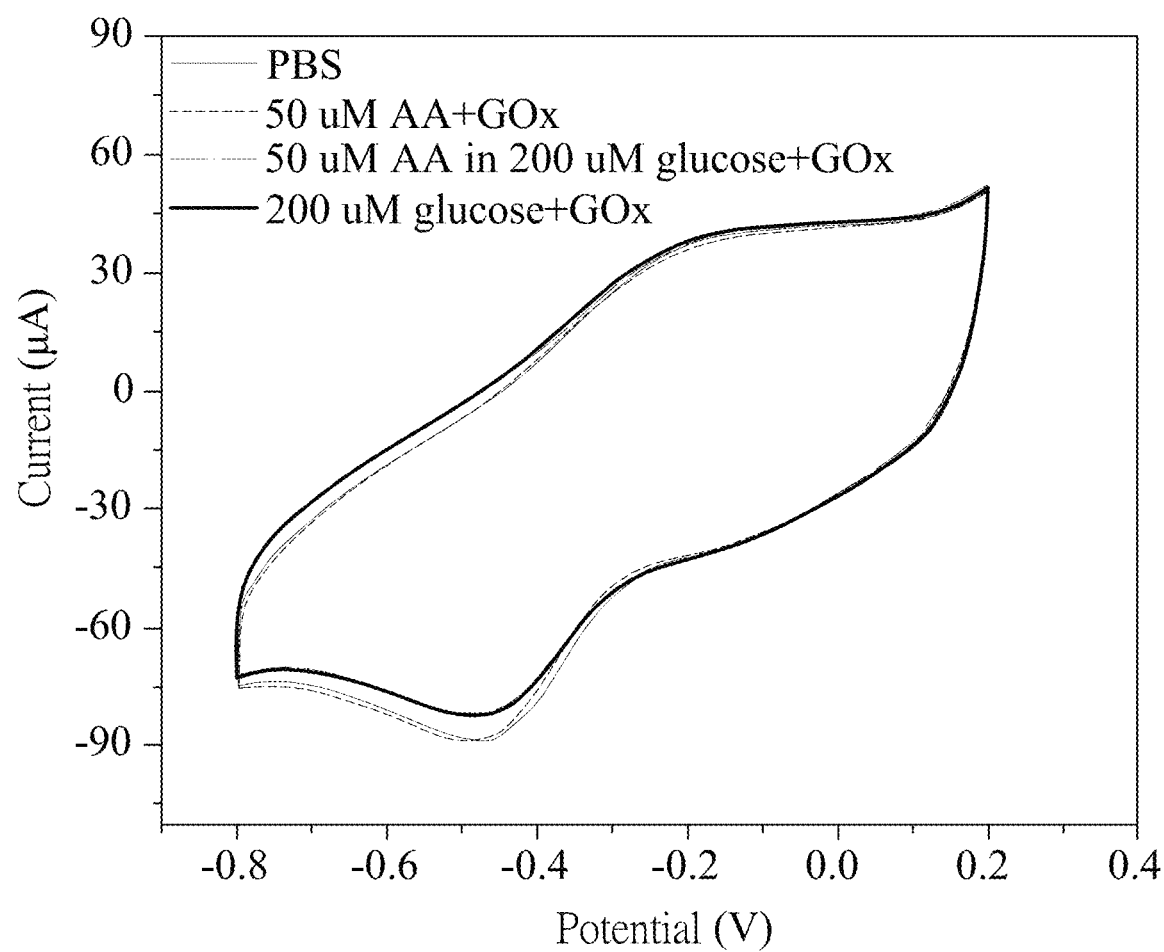
FIG. 9 is a cyclic voltammogram of the oxidation-reduction currents of different interfering samples that are measured by the embodiment of the sensor device in accordance with the present disclosure.
Figure 10:
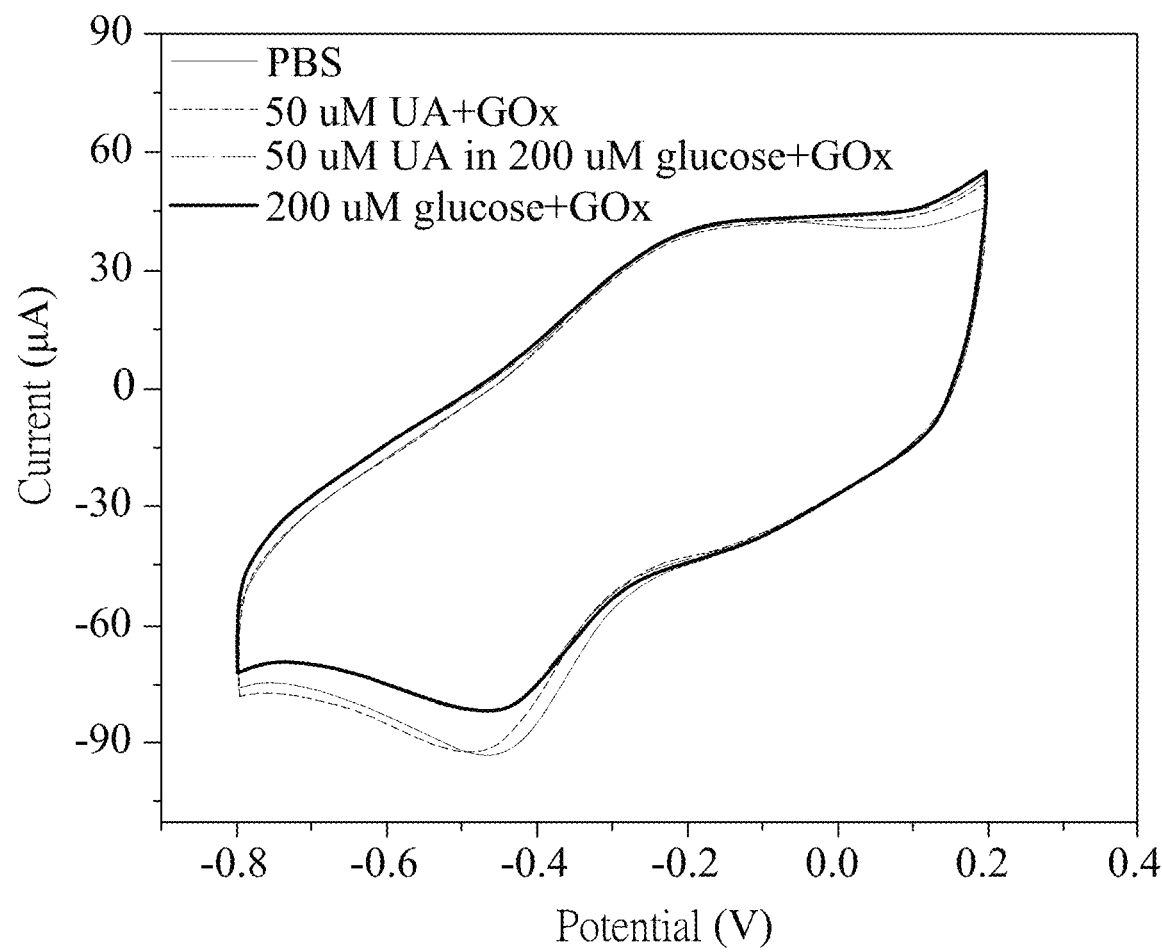
FIG. 10 is a cyclic voltammogram of the oxidation-reduction currents of different interfering samples that are measured by the embodiment of the sensor device in accordance with the present disclosure.

Referring to FIG. 8 to FIG. 10, the sensor device 2 of this present disclosure is employed to measure various samples (i.e., a phosphate buffered saline (PBS) sample, a sample containing glucose and GOx, a sample containing dopamine (DA) and GOx, a sample containing ascorbic acid (AA) and GOx, a sample containing urea acid (UA) and GOx, a sample containing dopamine (DA), glucose and GOx, a sample containing ascorbic acid (AA), glucose and GOx, a sample containing urea acid (UA), glucose and GOx, by virtue of cyclic voltammetry). It can be seen that each of the samples has its reduction peak current, which is generated by reduction of oxygen. That is to say, the more glucose that is contained in the sample, the more oxygen will be consumed, and so the reduction peak current will be lowered. The sample with glucose and the sample without glucose would have a current difference in redox peak current. The performance of glucose detection of the sensor device can also be determined by the current difference.

In addition to glucose, the saliva may contain other interfering substances such as dopamine (DA), ascorbic acid (AA), and urea acid (UA). It can be seen from FIGS. 8 to 10 that, even with the presence of the interfering substance in the sample containing glucose, the resultant reduction currents between the sample containing glucose and GOx and the sample containing glucose, GOx and the interfering substance (e.g., DA, AA or UA) are not significantly different. Therefore, the sensor device 2 of the present disclosure is excellent in detecting the glucose in the saliva in terms of selectivity and specificity.

In summary, by means of disposing the polymer layer 21 on the conductive substrate 20 followed by disposing the carbon nanomaterial unit 22 that includes at least one carbon-nanotube layer 221 on the polymer layer 21, a non-invasive sensor device 2 with enhanced sensing sensitivity and selectivity can be obtained. The sensor device 2 may detect glucose in the saliva directly, and the detectable concentration range thereof sufficiently covers the range of the glucose concentration in the saliva. In addition, by adding the enzyme as an external element to the sensor device 2 of this disclosure, the costs for coating an enzyme layer can be eliminated, and the contact surface area between the enzyme and the saliva is effectively increased. Therefore, the reaction between the glucose and the enzyme can be enhanced so as to further improve the sensing performance, and the object of the present disclosure is thus achieved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A sensor device, adapted to detect glucose concentration in saliva of an object, comprising:
    a conductive substrate;
    a polymer layer disposed on said conductive substrate and made from conducting polymer; and
    a plurality of carbon-nanotube layers disposed on said polymer layer;
    wherein a mixture of the saliva of the object and an enzyme is applied on the plurality of carbon-nanotube layers to detect the glucose concentration in the saliva, and
    wherein said sensor device is free of the enzyme.

2. The sensor device as claimed in claim 1, wherein said plurality of carbon-nanotube layers include 5 to 15 carbon-nanotube layers.

3. The sensor device as claimed in claim 1, wherein said polymer layer is made from one of polypyrrole, polyaniline, polythiophene, poly(p-phenylene sulfide), and combinations thereof.

4. The sensor device as claimed in claim 1, wherein said conductive substrate is one of a fluorine-doped tin oxide substrate, an indium tin oxide substrate, and a glassy carbon substrate.

5. The sensor device as claimed in claim 1, wherein the plurality of carbon-nanotube layers include acid-treated carbon-nanotubes.

6. A method for making a sensor device, comprising the following steps:
    providing a conductive substrate;
    immersing the conductive substrate in a first solution containing monomers of conducting polymer to form a polymer layer on the conductive substrate; and
    preparing a second solution containing a plurality of carbon nanotubes and applying the second solution on the polymer layer so as to form a plurality of carbon-nanotube layers on the polymer layer, wherein the sensor device is free of enzyme.

7. The method as claimed in claim 6, wherein the first solution is obtained by mixing an aqueous ammonium persulfate solution with an aqueous sulfuric acid solution and pyrrole monomers.

8. The method as claimed in claim 6, wherein, before preparing the second solution, the plurality of carbon nanotubes are subjected to an acid treatment.

9. The method as claimed in claim 8, wherein the acid treatment includes adding the plurality of carbon nanotubes to a third solution containing nitric acid and sulfuric acid to form a mixture, heating the mixture at a temperature ranging from 70° C. to 100° C., cooling the mixture to obtain the acid-treated carbon nanotubes, rinsing the acid-treated carbon nanotubes with deionized water, and drying the acid-treated carbon nanotubes.

10. The method as claimed in claim 6, wherein forming the plurality of carbon-nanotube layers comprises forming 5 to 15 carbon-nanotube layers on the polymer layer.

11. The method as claimed in claim 10, wherein applying the second solution on the polymer layer to form the plurality of carbon-nanotube layers on the polymer layer is conducted by:
    (a) applying the second solution on the polymer layer drop by drop, followed by drying the second solution on the polymer layer to form a first layer of the plurality of carbon-nanotube layers;
    (b) applying the second solution on the first layer of the plurality of carbon-nanotube layers drop by drop, followed by drying the second solution to form a second layer of the plurality of the carbon-nanotube layers; and
    (c) repeating the process of applying the second solution drop by drop and drying the second solution to form remaining layer of the plurality of the carbon-nanotube layers.

* * * * *